United States Patent
Yashima et al.

(10) Patent No.: US 7,514,487 B2
(45) Date of Patent: Apr. 7, 2009

(54) POLYCHLOROPRENE LATEX, PROCESS FOR THE PRODUCTION THEREOF AND AQUEOUS ADHESIVE COMPOSITIONS

(75) Inventors: Hiroyuki Yashima, Niigata (JP); Kenji Mochizuki, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 408 days.

(21) Appl. No.: 10/539,801

(22) PCT Filed: Dec. 19, 2003

(86) PCT No.: PCT/JP03/16384

§ 371 (c)(1),
(2), (4) Date: Jun. 20, 2005

(87) PCT Pub. No.: WO2004/056889

PCT Pub. Date: Jul. 8, 2004

(65) Prior Publication Data

US 2006/0063885 A1      Mar. 23, 2006

(30) Foreign Application Priority Data

| Dec. 19, 2002 | (JP) | 2002-367862 |
| Jan. 31, 2003 | (JP) | 2003-023929 |
| Jan. 31, 2003 | (JP) | 2003-023930 |
| Sep. 25, 2003 | (JP) | 2003-332753 |
| Sep. 30, 2003 | (JP) | 2003-340384 |

(51) Int. Cl.
   *C08L 11/02* (2006.01)
(52) U.S. Cl. ........................ 524/158; 524/367; 524/375
(58) Field of Classification Search ................ 524/158, 524/367, 375
   See application file for complete search history.

(56) References Cited

U.S. PATENT DOCUMENTS

| 3,839,241 | A | * | 10/1974 | Harrell, Jr. | 521/67 |
| 5,322,886 | A | | 6/1994 | Sauterey | |
| 5,766,762 | A | * | 6/1998 | Miyagawa et al. | 428/395 |
| 5,912,079 | A | * | 6/1999 | Miyagawa et al. | 428/375 |
| 6,525,132 | B1 | * | 2/2003 | Oba et al. | 524/764 |
| H002092 | H | * | 12/2003 | Bauman et al. | 523/102 |
| 7,073,201 | B2 | * | 7/2006 | Sunada et al. | 2/2.15 |
| 2005/0182173 | A1 | | 8/2005 | Yashima et al. | |

FOREIGN PATENT DOCUMENTS

| GB | 1 529 495 | 10/1978 |
| JP | 49-59186 | 6/1974 |
| JP | 51-136773 | 11/1976 |
| JP | 52-992 | 1/1977 |
| JP | 52-27494 | 3/1977 |
| JP | 52-91050 | 8/1977 |
| JP | 5-331440 | 12/1993 |
| JP | 6-287360 | 10/1994 |
| JP | 7-90031 | 4/1995 |
| JP | 8-188694 | 7/1996 |
| JP | 8-269114 | 10/1996 |
| JP | 9-12656 | 1/1997 |
| JP | 11-158326 | 6/1999 |
| JP | 2002-47377 | 2/2002 |
| JP | 2002-53702 | 2/2002 |
| JP | 2002-53703 | 2/2002 |

* cited by examiner

*Primary Examiner*—Peter Szekely
(74) *Attorney, Agent, or Firm*—Oblon, Spivak, McClelland, Maier & Neustadt, P.C.

(57) ABSTRACT

To provide a polychloroprene latex excellent in stability, a process for its production, and an aqueous adhesive composition employing it, excellent in the adhesive performance. A polychloroprene latex obtained by emulsion-polymerizing chloroprene, or chloroprene and a monomer copolymerizable with chloroprene, in the presence of from 0.5 to 15 parts by mass of a specific nonionic emulsifier and from 0.05 to 2 parts by mass of a specific anionic emulsifier, per 100 parts by mass of the whole monomer.

27 Claims, No Drawings

POLYCHLOROPRENE LATEX, PROCESS FOR THE PRODUCTION THEREOF AND AQUEOUS ADHESIVE COMPOSITIONS

TECHNICAL FIELD

The present invention relates to a polychloroprene latex useful as an adhesive, a process for its production and an aqueous adhesive composition employing it. More particularly, it relates to a polychloroprene latex suitable for an aqueous contact type adhesive and a two-part aqueous adhesive excellent in adhesive performance such as the initial adhesive force, the ordinary state adhesive force, the adhesion water resistance, etc., and a process for its production and further an aqueous adhesive composition employing it.

BACKGROUND ART

Heretofore, adhesives using polychloroprene as the base material are mainly of a solvent type. However, in recent years, problems at the time of using or producing solvent type adhesives, such as environment pollution, danger of inflammability, hygiene, etc. due to organic solvents have been pointed out, and the demand for not using a solvent is increasing.

As a method for not using a solvent, a method of substituting a latex adhesive for the solvent type adhesive is considered to be effective, and a study on latex adhesives employing various polymers has been actively carried out.

Among them, a polychloroprene latex adhesive exhibits a high adhesive force immediately after bonding by applying it to both adherends to be bonded, drying such adhesive layers, followed by bonding. From such a characteristic, it is expected to be utilized as an aqueous contact type adhesive. Nevertheless, as compared with a solvent type adhesive, it is inferior in the adhesive performance such as the initial adhesive strength, water resistance, etc., and an improvement in this respect has been desired.

Heretofore, as a technique for emulsion polymerization of chloroprene, a production method has, for example, been proposed wherein a metal salt of disproportionated abietic acid or an alkyl sulfonate compound is used as the main component of the emulsifier, and a nonionic emulsifier such as nonylphenol is used as a sub-component (e.g. JP-A-52-992, JP-A-52-27494, JP-A-51-136773, JP-A-52-91050 and JP-A-7-90031). In such an emulsifying system, it is difficult to produce a polychloroprene latex constantly, and when the produced latex is used for an adhesive, the performance tends to be inadequate. Further, a nonylphenol emulsifier is designated as an endocrine-disrupting chemical and thus is not preferable.

Further, a method for producing a polychloroprene latex adhesive has been proposed which comprises polymerizing chloroprene in the presence of an unsaturated carboxylic acid, a polyvinyl alcohol and a chain transfer agent. However, with such a polychloroprene latex, the adhesion water resistance has been inadequate (e.g. JP-A-06-287360).

DISCLOSURE OF THE INVENTION

The present invention is to solve such problems of the prior art and to provide a polychloroprene latex for an aqueous adhesive which is excellent in the initial adhesive force, the ordinary state adhesive force and the water resistance and which has good mechanical stability and storage stability, a process for its production, and an aqueous adhesive composition employing it.

The present inventors have conducted an extensive study to solve the above problems and as a result, have found that an aqueous adhesive composition comprising a polychloroprene latex obtained by emulsion polymerization of chloroprene, or chloroprene and a monomer copolymerizable with chloroprene, in the presence of a specific amount of a specific nonionic emulsifier and a specific amount of a specific anionic emulsifier, is excellent in the adhesive characteristics, and thus have accomplished the present invention.

Namely, the present invention provides the following:

1. A polychloroprene latex comprising a homopolymer of chloroprene or a copolymer of a chloroprene monomer with a monomer copolymerizable with chloroprene, characterized in that the chloroprene homopolymer or copolymer is one obtained by emulsion polymerization in the presence of from 0.5 to 15 parts by mass of a nonionic emulsifier having the formula (1) and from 0.05 to 2 parts by mass of an anionic emulsifier having the formula (2), per 100 parts by mass of the whole monomer:

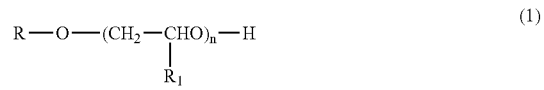
(1)

wherein R is a substituent containing at least one benzene ring and/or naphthalene ring, n is from 1 to 200, and $R_1$ is hydrogen or a $C_{1-5}$ alkyl group,

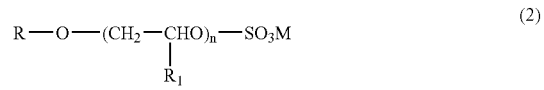
(2)

wherein R is a substituent containing at least one benzene ring and/or naphthalene ring, n is from 1 to 200, $R_1$ is hydrogen or a $C_{1-5}$ alkyl group, and M is a monovalent cation.

2. The polychloroprene latex according to the above 1, wherein the anionic emulsifier, instead of the anionic emulsifier having formula (2), is an aromatic sulfonic acid/formaline condensate, which is present in an amount of from 0.05 to 0.5 parts by mass, per 100 parts by mass of the whole monomer.

3. The polychloroprene latex according to the above 1 or 2, wherein the nonionic emulsifier having the formula (1) comprises two types of nonionic emulsifiers having HLB values being apart by at least 2 from each other.

4. The polychloroprene latex according to the above 1 or 2, wherein the nonionic emulsifier having the formula (1) comprises a nonionic emulsifier having a HLB value of at least 9 and less than 16, and a nonionic emulsifier having a HLB value of at least 16 and having no aromatic ring.

5. The polychloroprene latex according to any one of the above 1 to 4, wherein substituent R in the nonionic emulsifier having the formula (1) contains at least one styrene structure.

6. The polychloroprene latex according to any one of the above 1 to 5, wherein the monomer copolymerizable with chloroprene is an ethylenically unsaturated carboxylic acid, which is contained in an amount of from 0.3 to 10 parts by mass, per 100 parts by mass of the copolymer.

7. The polychloroprene latex according to the above 6, wherein the ethylenically unsaturated carboxylic acid is methacrylic acid, acrylic acid or a mixture thereof.
8. The polychloroprene latex according to any one of the above 1 to 7, which has a gel content of at most 60 mass %.
9. An aqueous adhesive composition obtained by adding a tackifier resin to the polychloroprene latex as defined in any one of the above 1 to 8.
10. An aqueous adhesive composition obtained by adding a tackifier resin and a metal oxide to the polychloroprene latex as defined in any one of the above 1 to 8.
11. A two-part aqueous adhesive composition which is a combination of a main agent containing as the main component the polychloroprene latex as defined in any one of the above 1 to 8, and a curing agent.
12. The two-part aqueous adhesive composition according to the above 11, wherein the main agent contains a metal oxide.
13. The two-part aqueous adhesive composition according to the above 11 or 12, wherein the curing agent is a water-dispersible isocyanate compound.
14. A process for producing a polychloroprene latex, characterized by emulsion-polymerizing chloroprene, or chloroprene and a monomer copolymerizable with chloroprene, in the presence of from 0.5 to 15 parts by mass of a nonionic emulsifier having the formula (1) and from 0.05 to 2 parts by mass of an anionic emulsifier having the formula (2), per 100 parts by mass of the whole monomer:

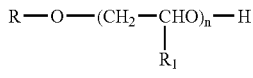  (1)

wherein R is a substituent containing at least one benzene ring and/or naphthalene ring, n is from 1 to 200, and $R_1$ is hydrogen or a $C_{1-5}$ alkyl group,

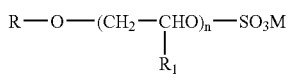  (2)

wherein R is a substituent containing at least one benzene ring and/or naphthalene ring, n is from 1 to 200, $R_1$ is hydrogen or a $C_{1-5}$ alkyl group, and M is a monovalent cation.

The aqueous adhesive composition and the two-part aqueous adhesive composition, each containing the polychloroprene latex obtained by the process of the present invention, are excellent in the initial adhesive strength and water resistance and suitable particularly for bonding wood material such as plywood, or bonding paper material, cloth, jersey, laser products, shoe components, synthetic resins, foamed resin sheets, steel plates, cement substrates, etc.

BEST MODE FOR CARRYING OUT THE INVENTION

In a case where a chloroprene copolymer is used in the present invention, an ethylenically unsaturated carboxylic acid may be employed as the monomer copolymerizable with chloroprene contained in the copolymer. As such an ethylenically unsaturated carboxylic acid, acrylic acid, methacrylic acid, crotonic acid, fumaric acid, maleic acid or citraconic acid may, for example, be mentioned, and if necessary, two or more types may be used in combination. Among them, it is preferred to use acrylic acid or methacrylic acid, and it is particularly preferred to use methacrylic acid.

The content of the ethylenically unsaturated carboxylic acid in the chloroprene copolymer is preferably from 0.3 to 10 parts by mass, more preferably from 1 to 5 parts by mass, per 100 parts by mass of the copolymer. If the content of the ethylenically unsaturated carboxylic acid exceeds 10 parts by mass, the adhesion water resistance of the aqueous adhesive composition tends to be poor, and if it is less than 0.3 part by mass, the mechanical stability of the latex tends to deteriorate.

As the monomer copolymerizable with chloroprene of the present invention, in addition to the above-mentioned ethylenically unsaturated carboxylic acid, an ester of acrylic acid, an ester of methacrylic acid, 2,3-dichloro-1,3-butadiene, 1-chloro-1,3-butadiene, butadiene, isoprene, styrene or acrylonitrile, may, for example, be mentioned, and if necessary, two or more types may be used in combination.

The nonionic emulsifier in the present invention is one having the formula (1):

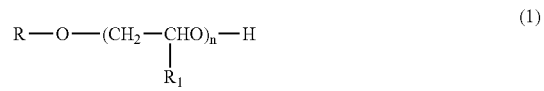  (1)

In the formula (1), R is a substituent containing at least one benzene ring and/or naphthalene ring, n is from 1 to 200, and $R_1$ is hydrogen or a $C_{1-5}$ alkyl group.

The following structures (I) to (XIII) may be mentioned as specific examples of substituent R. Further, these groups may be a mixture of two or more of them.

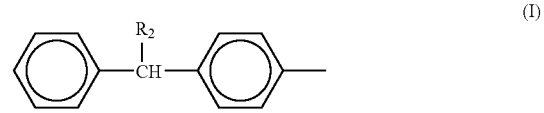  (I)

wherein $R_2$ is hydrogen or a $C_{1-6}$ alkyl group.

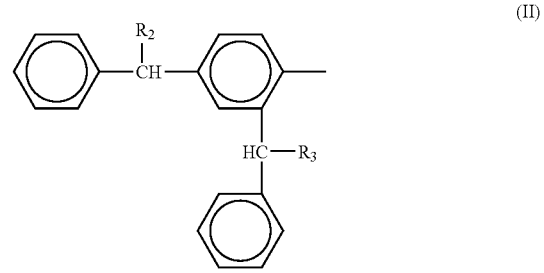  (II)

wherein each of $R_2$ and $R_3$ is hydrogen or a $C_{1-6}$ alkyl group.

(III)

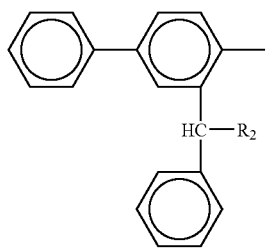

wherein $R_2$ is hydrogen or a $C_{1-6}$ alkyl group.

(IV)

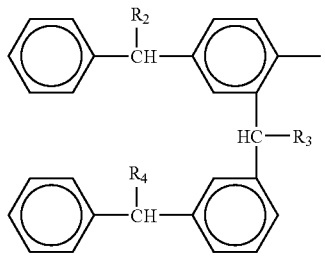

wherein each of $R_2$, $R_3$ and $R_4$ is hydrogen or a $C_{1-6}$ alkyl group.

(V)

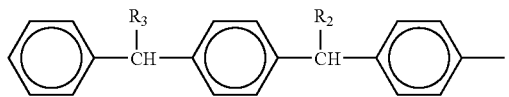

wherein each of $R_2$ and $R_3$ is hydrogen or a $C_{1-6}$ alkyl group.

(VI)

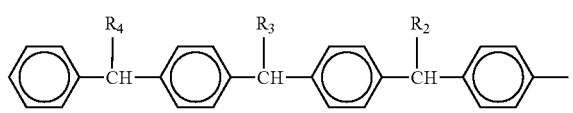

wherein each of $R_2$, $R_3$ and $R_4$ is hydrogen or a $C_{1-6}$ alkyl group.

(VII)

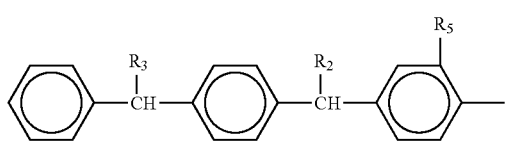

wherein each of $R_2$ and $R_3$ is hydrogen or a $C_{1-6}$ alkyl group, and $R_5$ is a $C_{1-6}$ alkyl group or a hydroxyl group.

(VIII)

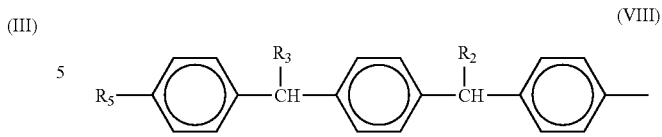

wherein each of $R_2$ and $R_3$ is hydrogen or a $C_{1-6}$ alkyl group, and $R_5$ is a $C_{1-6}$ alkyl group or a hydroxyl group.

(IX)

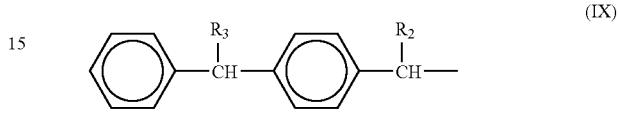

wherein each of $R_2$ and $R_3$ is hydrogen or a $C_{1-6}$ alkyl group.

(X)

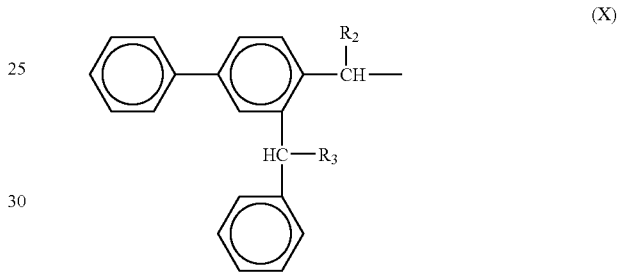

wherein each of $R_2$ and $R_3$ is hydrogen or a $C_{1-6}$ alkyl group.

(XI)

(XII)

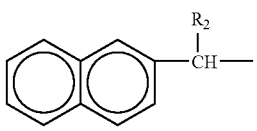

wherein $R_2$ is hydrogen or a $C_{1-6}$ alkyl group.

(XIII)

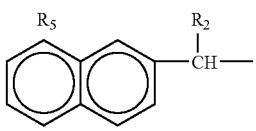

wherein $R_2$ is hydrogen or a $C_{1-6}$ alkyl group, and $R_5$ is a $C_{1-6}$ alkyl group or a hydroxyl group.

The nonionic emulsifier having the above formula (1) may, for example, be polyoxyethylene styrylphenyl ether, polyoxyethylene distyrylphenyl ether, polyoxyethylene tristyrylphenyl ether, polyoxyethylene styrylcresyl ether, polyoxyethylene distyrylcresyl ether, polyoxyethylene tristyrylcresyl ether, polyoxyethylene styrylhydroxyphenyl ether, polyoxyethylene distyrylhydroxyphenyl ether, polyoxyethylene tristyrylhydroxyphenyl ether, polyoxyethylene naphthyl ether, polyoxyethylene hydroxynaphthyl ether or polyoxyethylene cresylnaphthyl ether. Among them, one having at least one styrene structure, such as polyoxyethylene styrylphenyl ether, polyoxyethylene distyrylphenyl ether or polyoxyethylene tristyrylphenyl ether, is preferred. These nonionic emulsifiers may be used as a mixture.

The amount of the nonionic emulsifier of the formula (1) of the present invention is from 0.5 to 15 parts by mass, preferably from 1 to 7 parts by mass, per 100 parts by mass of the whole monomer comprising the chloroprene monomer, or the chloroprene monomer and the monomer copolymerizable with chloroprene (hereinafter referred to also as the whole monomer). If it is less than 0.5 part by mass, polymerization for a polychloroprene latex tends to be difficult. If it exceeds 15 parts by mass, the adhesion water resistance of the aqueous adhesive composition tends to deteriorate.

The HLB value of the nonionic emulsifier of the formula (1) to be used in the present invention is preferably at least 9, particularly preferably within a range of at least 12 and at most 19. If it departs from this range, constant polymerization of the chloroprene monomer tends to be difficult.

Here, the HLB value of the nonionic emulsifier is an index showing the hydrophilic/lipophilic balance devised by Mr. Griffin of ICI, U.S.A. and a numerical value of from 1 to 20 calculated in accordance with the following formula. The higher the HLB value, the higher the hydrophilic nature, and the lower the HLB value, the higher the lipophilic nature.

$$HLB=(\text{molecular weight of the hydrophilic group moiety})/(\text{molecular weight of surfactant})\times(100/5)$$

In the present invention, the nonionic emulsifier having the formula (1) preferably comprises a plurality of nonionic emulsifiers having HLB values being apart preferably by at least 2, particularly preferably by from 2.5 to 5, from one another. It is particularly preferred to use a nonionic emulsifier having a HLB value of at least 9 and less than 16, preferably from 11 to 15.5 (hereinafter referred to as the nonionic emulsifier A) and a nonionic emulsifier having a HLB value of at least 16, preferably at least 17 and having no aromatic ring (hereinafter referred to as the nonionic emulsifier B) in combination. The above nonionic emulsifier B is used to stabilize the polymerization behavior of the polychloroprene latex. The nonionic emulsifier B has a structure having no aromatic ring, and at least one type may be selected for use among polyoxyethylene derivatives such as a polyoxyalkylene alkyl ether, a polyoxyalkylene alkylallyl ether, a polyoxyalkylene sorbitan ether and a polyoxyethylene castor oil ether, sorbitan fatty acid esters such as sorbitan monostearate, sorbitan monolaurylate and sorbitan monopalmitate, fatty acid esters of glycerol such as glycerol monostearate and glycerol monooleate, and aliphatic alkanolamines.

The amount of the nonionic emulsifier A of the present invention is required to be from 1 to 10 parts by mass, preferably from 2 to 7 parts by mass, per 100 parts by mass of the whole monomer. If it is less than 1 part by mass, the mechanical stability of the polychloroprene latex tends to be inadequate, and if it exceeds 10 parts by mass, the adhesion water resistance of the aqueous adhesive composition tends to deteriorate.

On the other hand, the amount of the nonionic emulsifier B of the present invention is required to be from 0.1 to 2 parts by mass, preferably from 0.2 to 1.5 parts by mass, per 100 parts by mass of the whole monomer. If it is less than 0.1 part by mass, the mechanical stability of the polychloroprene latex tends to be inadequate, and if it exceeds 2 parts by mass, the adhesion water resistance of the aqueous adhesive composition tends to deteriorate.

The anionic emulsifier to be used in the present invention is one having the following formula (2):

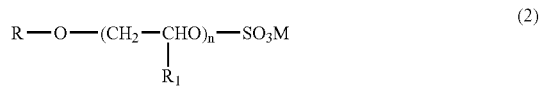

In the formula (2), R is a substituent containing at least one benzene ring and/or naphthalene ring, n is from 1 to 200, $R_1$ is hydrogen or a $C_{1-5}$ alkyl group, and M is a monovalent cation.

As specific examples of substituent R, the above-mentioned structures (I) to (XIII) may, for example, be mentioned. Such groups may be used in combination as a mixture of two or more of them.

Specific examples of substituent M may be ions of alkali metals such as lithium, sodium, potassium and cesium, and groups of various amines such as ammonia, trimethylamine, diethylamine and triethanolamine.

The anionic emulsifier of the present invention may, for example, be a sodium sulfonate of a polyoxyalkylene distyrylphenyl ether.

In the present invention, the anionic emulsifier is used in an amount of from 0.05 to 2 parts by mass, preferably from 0.1 to 2 parts by mass, particularly preferably from 0.2 to 1.5 parts by mass, per 100 parts by mass of the whole monomer. If the amount is less than 0.05 part by mass, the mechanical stability of the polychloroprene latex tends to be inadequate, and if it exceeds 2 parts by mass, the adhesion water resistance of the aqueous adhesive composition tends to deteriorate.

As the anionic emulsifier, instead of the anionic emulsifier having formula (2), a metal salt of an aromatic sulfonic acid/formaline condensate may be employed, and particularly, a lithium, sodium, potassium or cesium salt of a β-naphthalene sulfonic acid/formaline condensate may, for example, be mentioned. Among them, preferred is the sodium salt or the potassium salt. The metal salt of an aromatic sulfonic acid/formaline condensate is used for the purpose of improving the storage stability of the polychloroprene latex.

In a case where the metal salt of an aromatic sulfonic acid/formaline condensate is used as the anionic emulsifier, its amount is preferably from 0.05 to 1 part by mass, more preferably from 0.05 to 0.5 part by mass, most preferably from 0.08 to 0.4 part by mass, per 100 parts by mass of the whole monomer. If the amount is less than 0.05 part by mass, the effect to improve the storage stability of the polychloroprene latex tends to be small, and if it exceeds 0.5 part by mass, the mechanical stability of the polychloroprene latex tends to deteriorate.

The catalyst to be used for homopolymerization or copolymerization of chloroprene in the present invention, may, for example, be an inorganic peroxide such as potassium persulfate or an organic peroxide such as a ketone peroxide, a peroxyketal, a hydroperoxide, a dialkyl peroxide or a diacyl peroxide. As the catalyst, it is preferred to use potassium persulfate, whereby polymerization can be carried out constantly. Further, potassium persulfate is preferably used in the form of an aqueous solution having a concentration of from 0.1 to 5 mass %.

In order to increase the activities of the catalyst to be used for homopolymerization or copolymerization of chloroprene in the present invention, sodium sulfite, potassium sulfite, iron(II) oxide, β anthraquinone sodium sulfonate, formamidine sulfonic acid or L-ascorbic acid may, for example, be added.

In the present invention, the toluene-insoluble gel content in the polychloroprene latex is not particularly limited and may be optionally changed depending upon the required properties. However, in a case where the initial adhesive strength of the aqueous adhesive composition is regarded as more important, the gel content is preferably controlled to be at most 60 mass %, particularly preferably at most 50 mass %. Further, in a case where the heat resistance performance of the aqueous adhesive composition is regarded as important, the gel content is preferably controlled to be at least 20 mass %.

The gel content of the polychloroprene latex of the present invention can be optionally adjusted by controlling (1) use of a chain transfer agent and its amount, (2) the polymerization temperature and (3) the polymerization degree.

The chain transfer agent is not particularly limited so long as it is commonly used for the production of a chloroprene polymer, and a known chain transfer agent, such as a long chain alkyl mercaptan such as n-dodecyl mercaptan or tert-dodecyl mercaptan, a dialkyl xanthogen disulfide such as diisopropyl xanthogen disulfide or diethyl xanthogen disulfide, or iodoform, may be used.

The temperature for the above-mentioned polymerization is preferably within a range of from 0 to 55° C. from the viewpoint of the control of polymerization. Further, in order to carry out the polymerization reaction smoothly and safely, it is preferred to adjust the polymerization temperature within a range of from 10 to 45° C.

Further, the final polymerization degree is preferably at least 60 mass %, more preferably at least 90 mass %.

In the present invention, the solid content concentration in the polychloroprene latex is preferably within a range of from 40 to 65 mass %, more preferably within a range of from 45 to 60 mass %. The higher the solid content concentration, the faster the drying speed, and the better the initial adhesive property of the latex. Further, the solid content concentration may be adjusted also by the ratio of the monomer to water at the time of the polymerization. However, it can also be adjusted by carrying out concentration after the polymerization. The method for such concentration may, for example, be concentration under reduced pressure, but it is not particularly limited.

In the present invention, the pH may be freely adjusted by adding to the polychloroprene latex a basic substance such as diethanolamine or triethanolamine, or a weakly acidic salt such as sodium carbonate, potassium carbonate, trisodium phosphate, disodium hydrogen phosphate, tripotassium phosphate, dipotassium hydrogen phosphate, tripotassium citrate, dipotassium hydrogen citrate, sodium acetate, potassium acetate or sodium tetraborate.

The method of adding the pH adjusting agent in the present invention is not particularly limited, and a powder of the pH adjusting agent may be added directly or after being diluted to an optional proportion with water. The timing for addition of the pH adjusting agent is not particularly limited, and it may be added before the initiation of polymerization or after the completion of polymerization.

To the polychloroprene latex in the present invention, a dispersing agent such as an anionic emulsifier, a polyoxyalkylene alkyl ether, or a nonionic emulsifier such as a 1:2 mol type fatty acid alkanolamide, may be added. The timing for the addition is not particularly limited, and it may be added before the initiation of polymerization, during or after the completion of polymerization.

Further, for the purpose of terminating polymerization in the homopolymerization or copolymerization of chloroprene in the present invention, a polymerization inhibitor such as thiodiphenylamine, diethylhydroxylamine, hydroquinone, p-t-butylcatechol, 1,3,5-trihydroxybenzene, hydroquinone methyl ether, 2,6-di-t-butyl-4-methylphenol, 2,2-methylenebis(6-t-4-methylphenol), 4,4-butylenebis(6-t-butyl-3-methylphenol), ethylenebis(oxyethylene)bis[3-(5-t-butyl-4-hydroxy-m-tolyl)propionate], octadecyl-3-(3,5-di-t-butyl-4-hydroxyphenyl)propionate, pentaerythritol tetrakis[3-(3,5-di-t-butyl-4-hydroxyphenyl)propionate] may be added to the polymerization system.

The tackifier resin to be incorporated to the aqueous adhesive composition containing the polychloroprene latex of the present invention may, for example, be a resinate resin, a terpene phenol resin, a coumarone-indene resin, an aliphatic hydrocarbon resin or an aromatic resin. An emulsion of a terpene phenol resin or a resinate resin is particularly preferred with a view to obtaining the initial adhesive force and the water resistance of the aqueous adhesive composition.

The content (calculated as the solid content) of the tackifier resin in the aqueous adhesive composition is preferably from 10 to 100 parts by mass, particularly preferably from 20 to 70 parts by mass, per 100 parts by mass of the solid content of the latex. If it is less than 10 parts by mass, the initial adhesive force may sometimes be poor, and if it exceeds 100 parts by mass, formation of the adhesive coating film tends to be impaired.

The metal oxide to be preferably contained in the aqueous adhesive composition of the present invention may, for example, be zinc oxide, titanium oxide, aluminum oxide, magnesium oxide or iron oxide. Zinc oxide or titanium oxide is preferred with a view to improving the water resistance of the adhesive composition, and it is particularly preferred to use zinc oxide.

The content of the metal oxide in the aqueous adhesive composition is preferably from 0.2 to 6 parts by mass, particularly preferably from 0.5 to 3 parts by mass, per 100 parts by mass of the solid content of the polychloroprene latex. If it is less than 0.2 part by mass, the water resistance of the adhesive composition may sometimes be inadequate, and if it exceeds 6 parts by mass, the initial adhesive force tends to be poor.

The aqueous adhesive composition and the two-part aqueous adhesive composition of the present invention may optionally contain an inorganic filler such as calcium carbonate, silica, talc or clay, a plasticizer/softening agent such as dibutyl phthalate or process oil, a thickener such as sodium polyacrylate, water-soluble polyurethane or methyl cellulose, an emulsifier such as a polyoxyalkylene alkyl ether, a 1:2 mol type aliphatic alkanolamide, a 1:1 mol type diethanolamine, polyoxyethylene stearate or poval, a vulcanization accelerator such as zinc isopropyl xanthogenate, ethylene thiourea or tetrathiuram disulfide, an anticeptic, an anti-aging agent, an ultraviolet absorber, or an antioxidant, as the case requires.

The aqueous adhesive composition of the present invention is prepared by mixing the polychloroprene latex, the tackifier resin and the metal oxide, etc. The mixing means is not particularly limited, and a known apparatus such as a three one motor, a homogenizer media mill or a colloid mill may be used.

The two-part aqueous adhesive composition of the present invention is prepared by mixing the main agent and the curing agent, etc. The mixing means is not particularly limited, and a known apparatus such as a three one motor, a homogenizer media mill or a colloid mill may be used.

The mixing ratio of the main agent and the curing agent in the two-part aqueous adhesive composition of the present invention is preferably such that the curing agent is mixed so that it will be from 0.5 to 15 parts by mass as the solid content, per 100 parts by mass of the polychloroprene latex (solid content) in the main material. If the mixing ratio is outside the above range, the effect of the addition tends to be small.

The viscosity of the two-part aqueous adhesive composition of the present invention is preferably such that at most 10,000 (mPas·s) (B-model viscometer, 25° C., 30 rpm) can be maintained for 24 hours after mixing the main agent and the curing agent. If the viscosity becomes higher than 10,000 (mPas·s), uniform coating tends to be difficult.

The main agent of the two-part aqueous adhesive composition contains the polychloroprene latex as the main component, but a tackifier resin may optionally be incorporated, as the case requires.

The curing agent in the two-part aqueous adhesive composition of the present invention is added primarily for the purpose of improving the adhesive performance of the aqueous adhesive. It may, for example, be an epoxy compound, an oxazoline compound, or an isocyanate compound. As the curing agent, particularly preferred is an isocyanate compound.

Among such isocyanate compounds, it is particularly preferred to use a water-dispersible isocyanate compound. The water-dispersible isocyanate compound is one having hydrophilic groups introduced to a polyisocyanate polymer having a structure such as a biuret, an isocyanurate, an urethane, an allophanate in the molecule obtained from an aliphatic and/or alicyclic diisocyanate. Such an isocyanate compound is a self-emulsifiable isocyanate compound, which will be dispersed as fine particles when added and stirred in water.

The aqueous adhesive composition and the two-part adhesive composition obtained by the present invention, are suitable for bonding the same or different types of paper, wood, cloth, hides, jersey, leathers, rubbers, plastics, foams, porcelains, glass, mortal, cement materials, ceramics, metals, etc.

The application method for bonding may, for example, be brush coating, bar coating, spray coating or roll coater coating.

Now, the present invention will be described in further detail with reference to Examples. However, the present invention is by no means restricted by such Examples. Further, in the following Examples, "parts" and "%" are based on "mass" unless otherwise specified.

EXAMPLE 1

Using a reactor having an internal capacity of 3 liters, under a nitrogen stream, 100 parts of pure water, 5.0 parts of a nonionic emulsifier (1) (Newcol 714, manufactured by Nippon Nyukazai Co., Ltd.) and 0.3 part of a solid of a sodium salt of a β naphthalene sulfonic acid/formaline condensate (Demol L, manufactured by Kao Corporation) were charged and dissolved. Then, with stirring, 97 parts of a chloroprene monomer, 3 parts of methacrylic acid and 0.3 part of octyl mercaptan were added. While this mixture was maintained at 40° C., potassium persulfate and sodium sulfite were used as the initiators to carry out the polymerization, and when the final polymerization degree reached 95%, an emulsion of thiodiphenylamine was added to terminate the polymerization.

Stability of Polymerization Behavior

Runaway during the polymerization, or the presence or absence of precipitates immediately after completion of the polymerization, was observed and evaluated. The evaluation results are shown in Table 1 based on the following standards ⊚, ○ and X.

⊚: Control of the polymerization is simple, and precipitates after the polymerization are very little.

○: Control of the polymerization is easy, and precipitates after the polymerization are in a small amount.

X: Control of the polymerization is difficult, and precipitates after the polymerization are substantial.

Then, 12 parts of 20% diethanolamine was added to this polychloroprene latex, and the pH was adjusted to be neutral, whereupon water was further evaporated under reduced pressure to carry out concentration, so that the solid concentration would be 50%, thereby to obtain a polychloroprene latex.

Then, with respect to this polychloroprene latex, the following measurements were carried out, and the results are shown in Table 1.

Measurement of Mechanical Stability

In accordance with JIS K6828 and using a maroon type testing apparatus, the measurement was carried out by applying a load of 10 kg to 50 g of the latex and a shearing force of a rotational speed of 1,000 rpm. The formed coagulated product was dried and weighed, and the mechanical stability was evaluated by the following formula.

Mechanical stability (%)=dry weight of coagulated product g/solid content in 50 g of latex×100

Measurement of Gel Content

A latex sample was freeze-dried and then accurately weighed to obtain A. This sample was dissolved in toluene (adjusted to 0.6%) and subjected to a centrifugal separator, and then, the gel content was separated by using a metal net of 200 mesh. The gel content was dried in air and then dried in an atmosphere of 110° C. for one hour and accurately weighed to obtain B.

The gel content was calculated in accordance with the following formula.

Gel content=$B/A$×100 (%)

The results are shown in Table 1.

Storage Stability

The latex was stored in a glass bottle in a closed state at 23° C. for two months, and the change in the appearance was visually observed. The case where no abnormality was observed, was represented by ○, and a case where abnormality such as coagulation or precipitation was observed, was represented by X.

The results are shown in Table 1.

Then, an aqueous adhesive composition was prepared by the formulation as identified in Table 1.

To each of two sail cloths (25×150 mm), 300 g (solid content)/m$^2$ of an adhesive composition was applied by a brush, dried in an atmosphere of 80° C. for 9 minutes and left to stand at room temperature for one minute, whereupon the coated surfaces were put together and press-bonded by a hand roller. With respect to this bonded product, the following adhesive strength evaluation tests were carried out.

The results are shown in Table 1.

Initial Peel Strength

After pressing for 10 minutes, by means of a tensile tester, the 180° peel strength was measured at a tensile speed of 200 mm/min.

Ordinary State Peel Strength

After pressing for 7 days, by means of a tensile tester, the 180° peel strength was measured at a tensile speed of 200 mm/min.

Water Resistance Strength

After pressing for 7 days, the sample was immersed in water for two days, and by means of a tensile tester, the 180° peel strength was measured at a tensile speed of 200 mm/min.

Then, a two-part aqueous adhesive composition was prepared by the formulation as identified in Table 1.

Firstly, with respect to the two-part aqueous adhesive after mixed with the curing agent, the viscosity measurement was carried out.

Viscosity Measurement

Immediately after mixing the main agent and the curing agent and after 24 hours from the mixing, by means of a B-model viscometer (manufactured by TOKIMEC INC), the viscosity was measured at 25° C. at 30 rpm.

The results are shown in Table 1.

With respect to an adhesive having a viscosity of at most 10,000 mPas·s after 24 hours, the pot life was judged to be good.

The two-part aqueous adhesive prepared by mixing the main agent and the curing agent, was applied in an amount of 80 g/m² on a foamed polychloroprene (thickness: 3 mm), and then, a nylon cloth was immediately overlaid and press-bonded for one minute by a pressing apparatus heated to 110° C., to obtain a bonded structure (size of overlap portion: 2 cm in width×7 cm in length). With respect to this bonded structure, the above-mentioned adhesive strength evaluation tests were carried out.

The results are shown in Table 1.

EXAMPLE 2

A polychloroprene latex was prepared in the same manner as in Example 1 except that in Example 1, the sodium salt of a β naphthalene sulfonic acid/formaline condensate was changed to 0.3 part by mass (calculated as the solid content) of a liquid product (Demol NL, manufactured by Kao Corporation).

EXAMPLE 3

A polychloroprene latex was prepared in the same manner as in Example 1 except that in Example 1, the sodium salt of a β naphthalene sulfonic acid/formaline condensate was changed to an anionic emulsifier (1) (Newcol 707SN, manufactured by Nippon Nyukazai Co., Ltd.).

EXAMPLE 4

A polychloroprene latex was prepared in the same manner as in Example 1 except that in Example 1, the nonionic emulsifier (1) was changed to 4.5 parts by mass of a nonionic emulsifier (2) (Newcol 710, manufactured by Nippon Nyukazai Co., Ltd.) and 1.0 part by mass of a nonionic emulsifier (3) (NOIGEN 197, manufactured by Daiichi Kogyo Seiyaku Co., Ltd.), and the amount of the sodium salt of a β naphthalene sulfonic acid/formaline condensate (Demol N, manufactured by Kao Corporation) was changed to 0.1 part by mass.

EXAMPLE 5

A polychloroprene latex was prepared in the same manner as in Example 4 except that in Example 4, the nonionic emulsifier (3) was changed to a nonionic emulsifier (4) (Emulgen 1135 S-70, manufactured by Kao Corporation).

EXAMPLE 6

A polychloroprene latex was prepared in the same manner as in Example 1 except that in Example 1, the nonionic emulsifier (1) was changed to a nonionic emulsifier (5) (PIONIN D6115, manufactured by Takemoto Oil & Fat Co., Ltd.), the amount of the sodium salt of a β naphthalene sulfonic acid/formaline condensate (Demol N, manufactured by Kao Corporation) was changed to 0.6 part by mass, and the final polymerization degree was changed to 90%.

COMPARATIVE EXAMPLE 1

A polychloroprene latex was prepared in the same manner as in Example 1 except that in Example 1, the nonionic emulsifier was changed to polyvinyl alcohol (PVA-405, manufactured by Kuraray Co., Ltd.).

COMPARATIVE EXAMPLE 2

A polychloroprene latex was prepared in the same manner as in Example 3 except that in Example 3, the nonionic emulsifier (1) was changed to 1.0 part by mass of a nonionic emulsifier (5) (NEWCOL 568, manufactured by Nippon Nyukazai Co., Ltd.), and the anionic emulsifier (1) was changed to 4.0 parts by mass of an anionic emulsifier (2) (LATEMUL PS, manufactured by Kao Corporation).

The natures of the latexes obtained in Examples 2 to 6 and Comparative Examples 1 and 2, and formulations of their adhesive compositions and the results of the peel strength tests are shown in Table 1.

TABLE 1

|  |  | Ex. 1 | Ex. 2 | Ex. 3 | Ex. 4 | Ex. 5 | Ex. 6 |
| --- | --- | --- | --- | --- | --- | --- | --- |
| Formulation of polychloroprene latex (parts) | Chloroprene | 97 | 97 | 97 | 97 | 97 | 97 |
|  | Methacrylic acid | 3 | 3 | 3 | 3 | 3 | 3 |
|  | n-Dodecyl mercaptan | 0.3 | 0.3 | 0.3 | 0.3 | 0.3 | 0.3 |
|  | Pure water | 100 | 100 | 100 | 100 | 100 | 130 |
|  | *1) Nonionic emulsifier (1) | 5.0 | 5.0 | 5.0 |  |  |  |
|  | *2) Nonionic emulsifier (2) |  |  |  | 4.5 | 4.5 |  |
|  | *3) Nonionic emulsifier (3) |  |  |  | 1.0 |  |  |
|  | *4) Nonionic emulsifier (4) |  |  |  |  | 1.0 |  |
|  | *5) Nonionic emulsifier (5) |  |  |  |  |  | 5.0 |
|  | *6) Anionic emulsifier (1) |  |  | 0.5 |  |  |  |
|  | *7) Sodium salt of β naphthalene sulfonic acid/formaline condensate (solid) | 0.3 |  |  | 0.1 | 0.1 | 0.6 |

TABLE 1-continued

| | | | | | | | |
|---|---|---|---|---|---|---|---|
| | *8) Sodium salt of β naphthalene sulfonic acid/formaline condensate (liquid) | | | 0.3 | | | |
| Polymerization conditions | Polymerization temperature ° C. | 40 | 40 | 40 | 40 | 40 | 40 |
| | Polymerization degree % | 95 | 95 | 95 | 95 | 95 | 90 |
| | Stability of polymerization behavior | ○ | ○ | ○ | ◎ | ◎ | ○ |
| Nature of polychloroprene latex | Solid content concentration wt % | 50 | 50 | 50 | 50 | 50 | 50 |
| | Mechanical stability % | 0.005 | 0.005 | 0.010 | 0.045 | 0.025 | 0.069 |
| | Gel content % | 40 | 41 | 35 | 31 | 37 | 12 |
| | Storage stability | ○ | ○ | ○ | ○ | ○ | ○ |
| Formulation of aqueous adhesive composition (parts calculated as solid content) | Above polychloroprene latex | 100 | 100 | 100 | 100 | 100 | 100 |
| | *10) Terpene phenol type resin emulsion | 50 | 50 | 50 | 50 | 50 | 50 |
| | *11) Zinc oxide emulsion | 1 | 1 | 1 | 1 | 1 | 1 |
| Adhesive test results 1 (N/mm) | Initial adhesive strength | 5.0 | 5.1 | 5.0 | 5.1 | 4.8 | 5.1 |
| | Ordinary state adhesive strength | 5.0 | 4.9 | 5.2 | 5.4 | 4.9 | 5.5 |
| | Adhesion water resistance | 4.8 | 4.8 | 4.8 | 4.8 | 4.6 | 4.8 |
| Two-part aqueous adhesive — Formulation of composition (parts calculated as solid content) | Above polychloroprene latex main agent | 100 | 100 | 100 | 100 | 100 | 100 |
| | Zinc oxide emulsion main agent | 5 | 5 | 5 | 5 | 5 | 5 |
| | *12) Thickener main agent | 0.06 | 0.06 | 0.06 | 0.06 | 0.06 | 0.06 |
| | *13) Water dispersible isocyanate compound curing agent | 3 | 3 | 3 | 3 | 3 | 3 |
| Viscosity (mPa·s) | Immediately after blending the curing agent | 1680 | 1620 | 1540 | 1630 | 1680 | 1390 |
| | After 24 hours from blending the curing agent | 2380 | 2290 | 2320 | 2530 | 2380 | 2210 |
| Adhesive test results 2 (N/mm) | *14) Initial adhesive strength | Material fracture | Material fracture | Material fracture | Material fracture | Material fracture | Material fracture |
| | Ordinary state adhesive strength | Material fracture | Material fracture | Material fracture | Material fracture | Material fracture | Material fracture |
| | Adhesion water resistance | Material fracture | Material fracture | Material fracture | Material fracture | Material fracture | Material fracture |

| | | Comp. Ex. 1 | Comp. Ex. 2 |
|---|---|---|---|
| Formulation of polychloroprene latex (parts) | Chloroprene | 97 | 97 |
| | Methacrylic acid | 3 | 3 |
| | n-Dodecyl mercaptan | 0.3 | 0.3 |
| | Denka poval B-05 | 5.0 | |
| | *8) Anionic emulsifier (2) | | 4.0 |
| | *9) Nonionic emulsifier (6) | | 1.0 |
| Polymerization conditions | Polymerization temperature ° C. | 40 | 40 |
| | Polymerization degree % | 90 | 90 |
| | Stability of polymerization behavior | ○ | X |
| Nature of polychloroprene latex | Solid content concentration wt % | 50 | 50 |
| | Mechanical stability % | 0.005 | 0.220 |
| | Gel content % | 29 | 34 |
| | Storage stability | ○ | Δ |
| Formulation of aqueous adhesive composition (parts calculated as solid content) | Above polychloroprene latex | 100 | 100 |
| | *10) Terpene phenol type resin emulsion | 50 | 50 |
| | *11) Zinc oxide emulsion | 1 | 1 |
| Adhesive test results 1 (N/mm) | Initial adhesive strength | 1.9 | 1.9 |
| | Ordinary state adhesive strength | 5.3 | 3.3 |
| | Adhesion water resistance | 2.2 | 2.2 |
| Two-part aqueous adhesive — Formulation of composition (parts calculated as solid content) | Above polychloroprene latex main agent | 100 | 100 |
| | Zinc oxide emulsion main agent | 5 | 5 |
| | *12) Thickener main agent | 0.06 | 0.06 |
| | *13) Water dispersible isocyanate compound curing agent | 3 | 3 |
| Viscosity (mPa·s) | Immediately after blending the curing agent | 1840 | *15) Coagulated |
| | After 24 hours from blending the curing agent | >10000 | |
| Adhesive test results 2 (N/mm) | *14) Initial adhesive strength | 0.1 | Not measurable |
| | Ordinary state adhesive strength | 0.3 | Not measurable |
| | Adhesion water resistance | 0.3 | Not measurable |

*Notes
1) Nonionic emulsifier (1): Newcol 714 (Polyoxyalkylene distyrylphenyl ether type, HLB = 15.0, manufactured by Nippon Nyukazai Co., Ltd.)
2) Nonionic emulsifier (2): Newcol 710 (Polyoxyalkylene distyrylphenyl ether type, HLB = 13.6, manufactured by Nippon Nyukazai Co., Ltd.)
3) Nonionic emulsifier (3): NOIGEN EA197 (Polyoxyalkylene distyrylphenyl ether type, HLB = 17.5, manufactured by Daiichi Kogyo Seiyaku Co., Ltd.)
4) Nonionic emulsifier (4): Emulgen 1135S-70 (Polyoxyalkylene alkyl ether type, HLB = 17.9, manufactured by Kao Corporation)
5) Nonionic emulsifier (5): PIONIN D6115 (Polyoxyalkylene tristyrylphenyl ether type, HLB = 12.0, manufactured by Takemoto Oil &Fat Co., Ltd.)

TABLE 1-continued

6) Anionic emulsifier (1): Newcol 707SN (Polyoxyalkylene distyrylphenyl ether sodium sulfonate type, manufactured by Nippon Nyukazai Co., Ltd.)
7) Sodium salt of β naphthalene sulfonic acid/formaline condensate (solid): Demol N (manufactured by Kao Corporation)
8) Sodium salt of β naphthalene sulfonic acid/formaline condensate (liquid): Demol NL (manufactured by Kao Corporation), solid content: 40%
9) Anionic emulsifier (2): LATEMUL PS (sodium alkane sulfonate type, manufactured by Kao Corporation)
10) Nonionic emulsifier (6): Newcol 568 (Polyoxyethylene nonylphenyl ether type, HLB = 15.2, Nippon Nyukazai Co., Ltd.)
11) Terpene phenol type resin emulsion: TAMANOL E-100 (solid content: 50%, manufactured by Arakawa Chemical Industries, Ltd.)
12) Zinc oxide emulsion: AZ-SW (solid content: 50%, manufactured by OSAKI INDUSTRY Co., LTD)
13) Thickener: UH-450 (water-soluble polyurethane type thickener, solid content: 30%, manufactured by Adeka Clean Aid CO., Ltd.)
14) Water dispersible isocyanate compound: TAKENATE WD-730 (manufactured by Takeda Chemical Industries, Ltd.)
15) Material fracture (Adhesive Test 2): Foamed polychloroprene as the adherend was fractured (desirable fracture mode)
16) Coagulated (Comp. Ex. 2): The sample was coagulated when the curing agent was introduced, whereby it was not possible to measure the adhesive strength.

The invention claimed is:

1. A polychloroprene latex comprising a homopolymer of chloroprene or a copolymer of a chloroprene monomer with a monomer copolymerizable with chloroprene, wherein the chloroprene homopolymer or copolymer is one obtained by emulsion polymerization in the presence of from 0.5 to 15 parts by mass of a nonionic emulsifier having the formula (1) and from 0.05 to 2 parts by mass of an anionic emulsifier having the formula (2), per 100 parts by mass of the whole monomer:

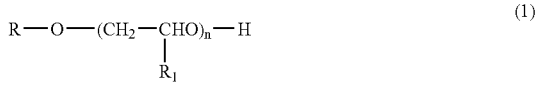

wherein R is a substituent containing at least one benzene ring and/or naphthalene ring, n is from 1 to 200, and $R_1$ is hydrogen or a $C_{1-5}$ alkyl group,

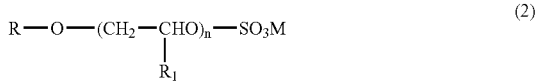

wherein R is a substituent containing at least one benzene ring and/or naphthalene ring, n is from 1 to 200, $R_1$ is hydrogen or a $C_{1-5}$ alkyl group, and M is a monovalent cation.

2. The polychloroprene latex according to claim 1, wherein the nonionic emulsifier having the formula (1) comprises two types of nonionic emulsifiers having HLB values being apart by at least 2 from each other.

3. The polychloroprene latex according to claim 1, wherein the nonionic emulsifier having the formula (1) comprises a nonionic emulsifier having a HLB value of at least 9 and less than 16, and a nonionic emulsifier having a HLB value of at least 16 and having no aromatic ring.

4. The polychloroprene latex according to claim 1, wherein substituent R in the nonionic emulsifier having the formula (1) contains at least one styrene structure.

5. The polychloroprene latex according to claim 1, wherein the monomer copolymerizable with chloroprene is an ethylenically unsaturated carboxylic acid, which is contained in an amount of from 0.3 to 10 parts by mass, per 100 parts by mass of the copolymer.

6. The polychloroprene latex according to claim 5, wherein the ethylenically unsaturated carboxylic acid is methacrylic acid, acrylic acid or a mixture thereof.

7. The polychloroprene latex according to claim 1, which has a gel content of at most 60 mass %.

8. An aqueous adhesive composition obtained by adding a tackifier resin to the polychloroprene latex as defined in claim 1.

9. An aqueous adhesive composition obtained by adding a tackifier resin and a metal oxide to the polychloroprene latex as defined in claim 1.

10. A two-part aqueous adhesive composition which is a combination of a main agent containing as the main component the polychloroprene latex as defined in claim 1, and a curing agent.

11. The two-part aqueous adhesive composition according to claim 10, wherein the main agent contains a metal oxide.

12. The two-part aqueous adhesive composition according to claim 10 or 11, wherein the curing agent is a water-dispersible isocyanate compound.

13. A process for producing a polychloroprene latex, comprising emulsion-polymerizing chloroprene, or chloroprene and a monomer copolymerizable with chloroprene, in the presence of from 0.5 to 15 parts by mass of a nonionic emulsifier having the formula (1) and from 0.05 to 2 parts by mass of an anionic emulsifier having the formula (2), per 100 parts by mass of the whole monomer:

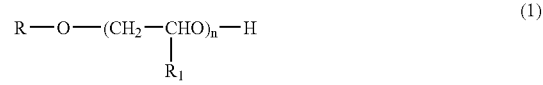

wherein R is a substituent containing at least one benzene ring and/or naphthalene ring, n is from 1 to 200, and $R_1$ is hydrogen or a $C_{1-5}$ alkyl group,

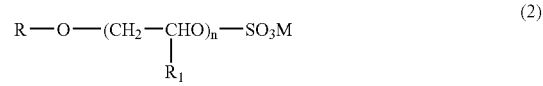

wherein R is a substituent containing at least one benzene ring and/or naphthalene ring, n is from 1 to 200, $R_1$ is hydrogen or a $C_{1-5}$ alkyl group, and M is a monovalent cation.

14. The polychloroprene latex according to claim 1, wherein the anionic emulsifier having the formula (2) is a sodium sulfonate of a polyoxyalkylene distyrylphenyl ether.

15. A polychloroprene latex comprising a homopolymer of chloroprene or a copolymer of a chloroprene monomer with a monomer copolymerizable with chloroprene, wherein the chloroprene homopolymer or copolymer is one obtained by emulsion polymerization in the presence of from 0.5 to 15 parts by mass of a nonionic emulsifier having the formula (1) and from 0.05 to 0.5 parts by mass of an anionic emulsifier comprising a metal salt of an aromatic sulfonic acid/formaline condensate, per 100 parts by mass of the whole monomer:

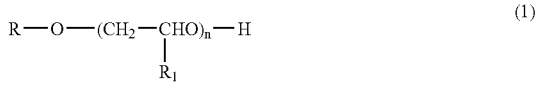

wherein R is a substituent containing at least one unsubstituted or substituted styrylphenyl group, n is from 1 to 200, and $R_1$ is hydrogen or a $C_{1-5}$ alkyl group.

16. The polychloroprene latex according to claim 15, wherein the nonionic emulsifier having the formula (1) comprises two types of nonionic emulsifiers having HLB values being apart by at least 2 from each other.

17. The polychloroprene latex according to claim 15, wherein the nonionic emulsifier having the formula (1) comprises a nonionic emulsifier having a HLB value of at least 9 and less than 16, and a nonionic emulsifier having a HLB value of at least 16 and having no aromatic ring.

18. The polychloroprene latex according to claim 15, wherein substituent R in the nonionic emulsifier having the formula (1) contains at least one styrene structure.

19. The polychloroprene latex according to claim 15, wherein the monomer copolymerizable with chloroprene is an ethylenically unsaturated carboxylic acid, which is contained in an amount of from 0.3 to 10 parts by mass, per 100 parts by mass of the copolymer.

20. The polychloroprene latex according to claim 19, wherein the ethylenically unsaturated carboxylic acid is methacrylic acid, acrylic acid or a mixture thereof.

21. The polychloroprene latex according to claim 15, which has a gel content of at most 60 mass %.

22. An aqueous adhesive composition obtained by adding a tackifier resin to the polychloroprene latex as defined in claim 15.

23. An aqueous adhesive composition obtained by adding a tackifier resin and a metal oxide to the polychloroprene latex as defined in claim 15.

24. A two-part aqueous adhesive composition which is a combination of a main agent containing as the main component the polychloroprene latex as defined in claim 15, and a curing agent.

25. The two-part aqueous adhesive composition according to claim 24, wherein the main agent contains a metal oxide.

26. The two-part aqueous adhesive composition according to claim 24, wherein the curing agent is a water-dispersible isocyanate compound.

27. A process for producing a polychloroprene latex, comprising emulsion-polymerizing chloroprene, or chloroprene and a monomer copolymerizable with chloroprene, in the presence of from 0.5 to 15 parts by mass of a nonionic emulsifier having the formula (1) and from 0.05 to 0.5 parts by mass of an anionic emulsifier comprising a metal salt of an aromatic sulfonic acid/formaline condensate, per 100 parts by mass of the whole monomer:

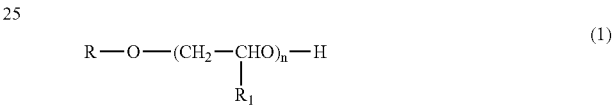

wherein R is a substituent containing at least one unsubstituted or substituted styrylphenyl group, n is from 1 to 200, and $R_1$ is hydrogen or a $C_{1-5}$ alkyl group.

* * * * *